R. W. & L. H. BATEMAN.
DRIVING AND REVERSING GEARING.
APPLICATION FILED DEC. 30, 1912.

1,111,206.

Patented Sept. 22, 1914.
9 SHEETS—SHEET 1.

Witnesses.
H. L. Alden
H. M. Barrett

Inventors
Richard W. Bateman
Loftus H. Bateman
by Spear, Middleton, Donaldson & Spear
Attorneys R. W. & L. H. BATEMAN.
DRIVING AND REVERSING GEARING.
APPLICATION FILED DEC. 30, 1912.
1,111,206.
Patented Sept. 22, 1914.
9 SHEETS—SHEET 2.
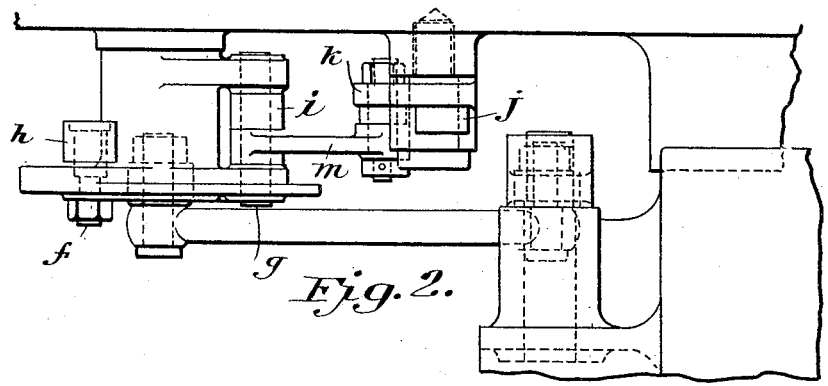
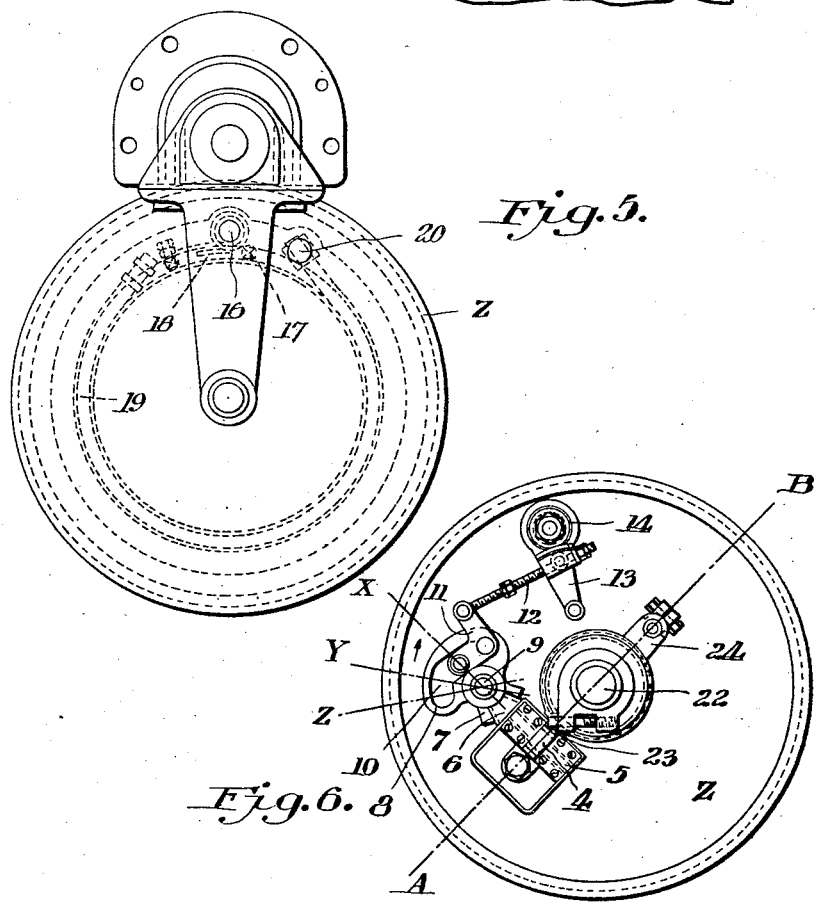

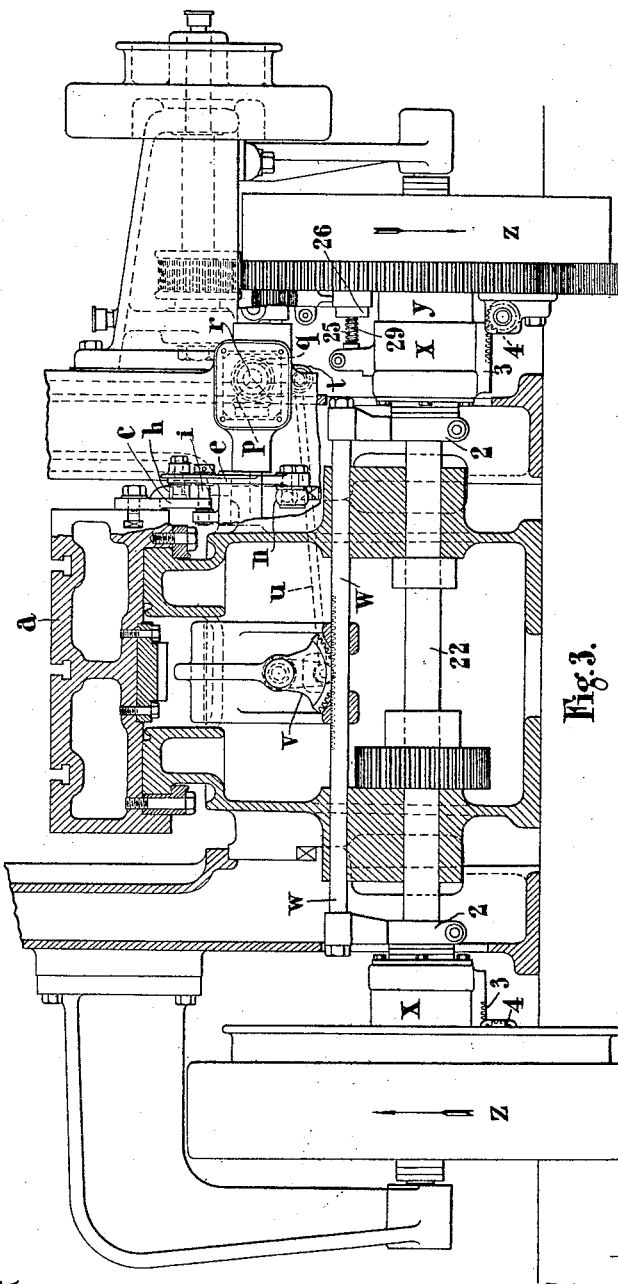

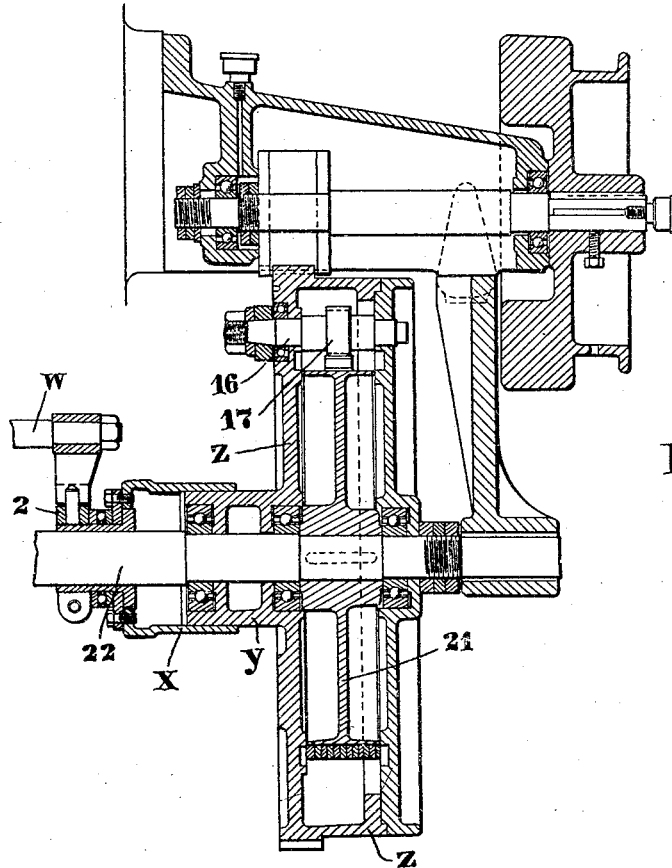

R. W. & L. H. BATEMAN.
DRIVING AND REVERSING GEARING.
APPLICATION FILED DEC. 30, 1912.
1,111,206.
Patented Sept. 22, 1914.
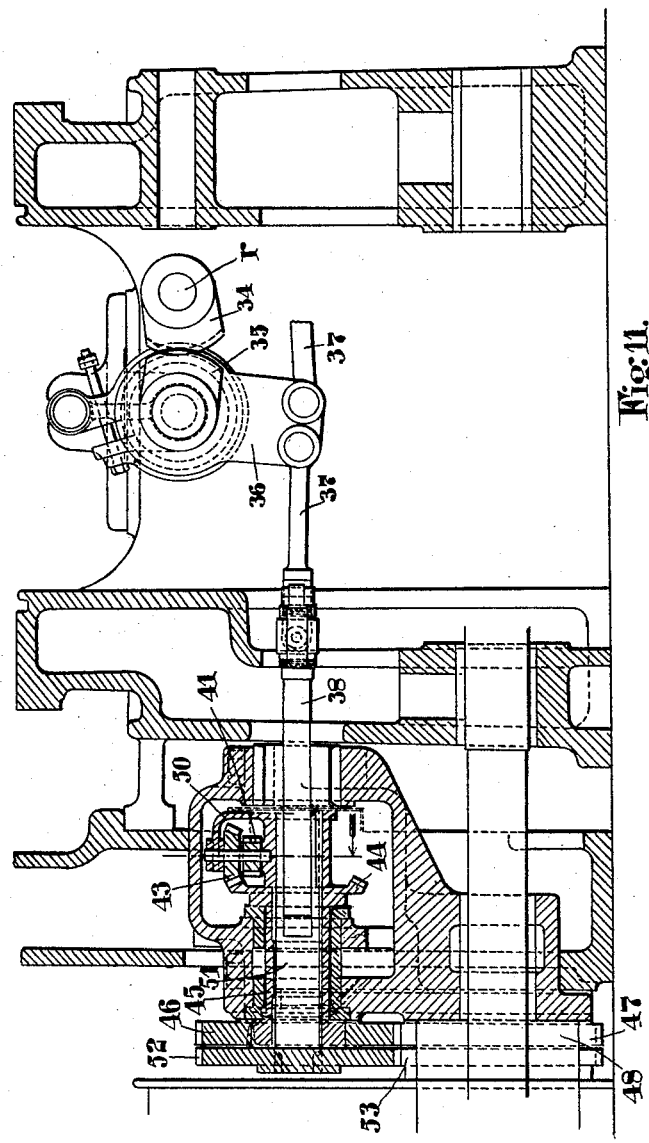
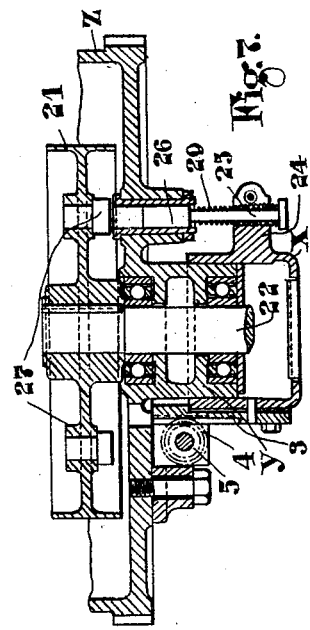

R. W. & L. H. BATEMAN.
DRIVING AND REVERSING GEARING.
APPLICATION FILED DEC. 30, 1912.

1,111,206.

Patented Sept. 22, 1914.
9 SHEETS—SHEET 6.

Witnesses.    Inventors
H. L. Alden    Richard W. Bateman
H. M. Barrett    Loftus H. Bateman
    by Spear, Middleton, Donaldson & Spear
    Attorneys

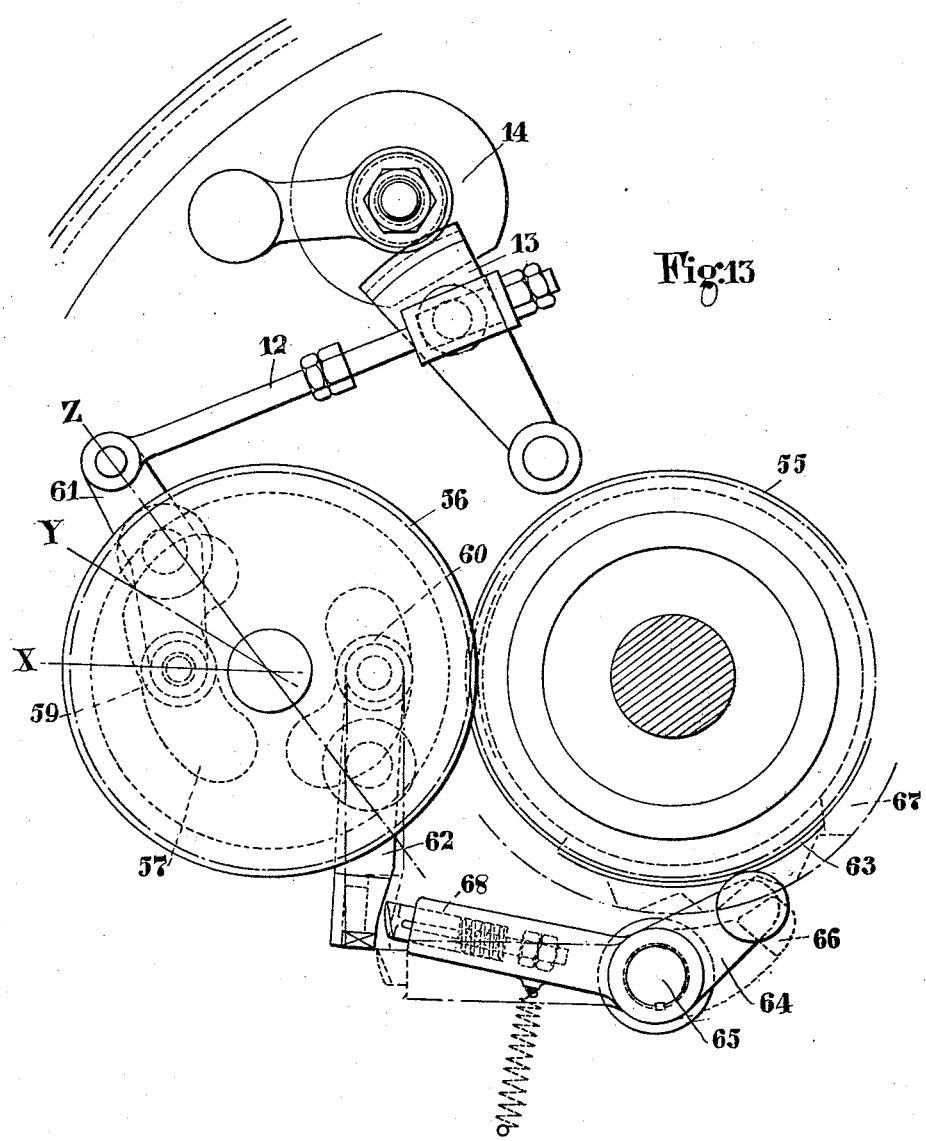

R. W. & L. H. BATEMAN.
DRIVING AND REVERSING GEARING.
APPLICATION FILED DEC. 30, 1912.
1,111,206.
Patented Sept. 22, 1914.
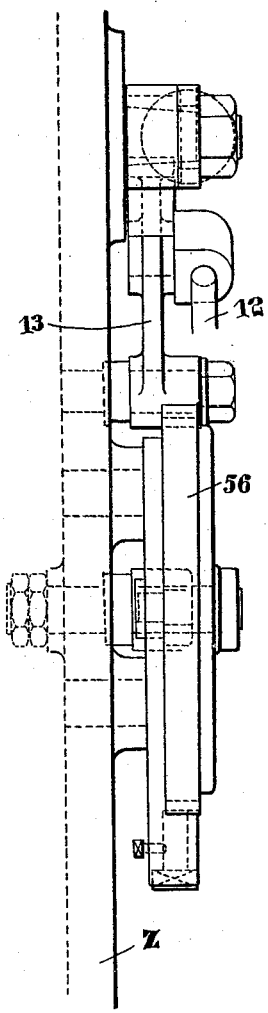
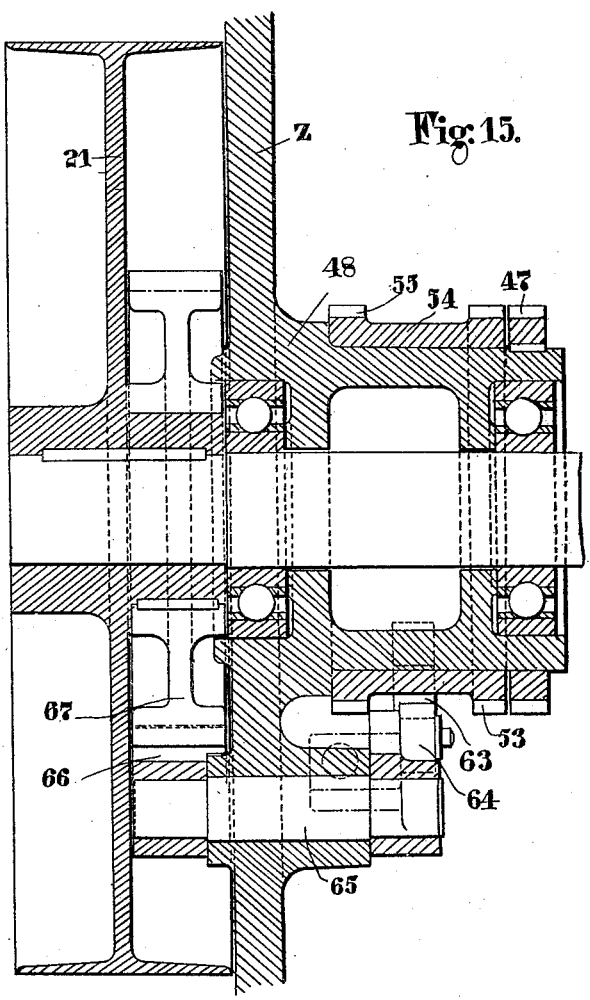

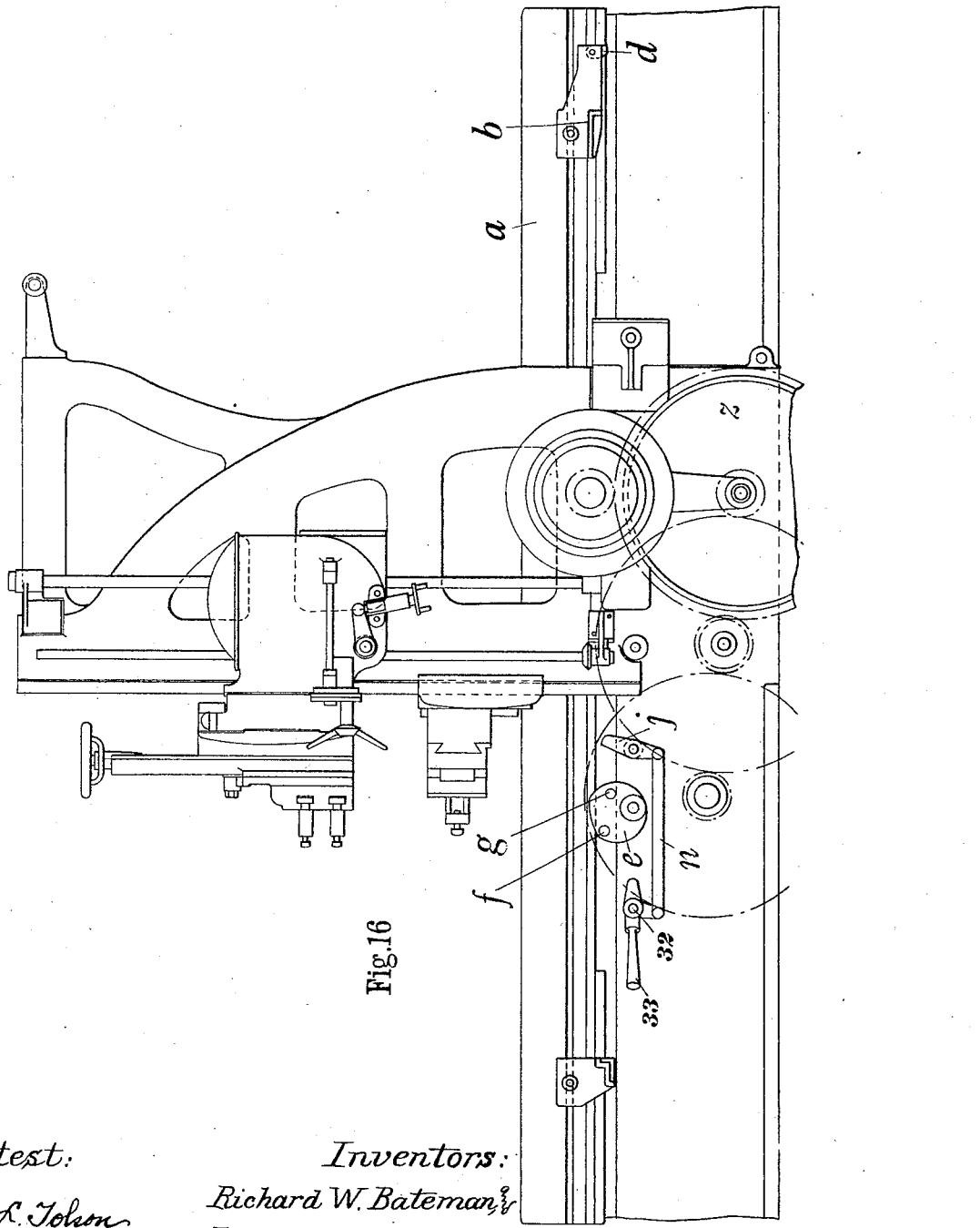

UNITED STATES PATENT OFFICE.

RICHARD WILKINSON BATEMAN, OF LEEDS, AND LOFTUS HANSON BATEMAN, OF LONGSIGHT, MANCHESTER, ENGLAND.

DRIVING AND REVERSING GEARING.

1,111,206.  Specification of Letters Patent.  Patented Sept. 22, 1914.

Application filed December 30, 1912.  Serial No. 739,310.

*To all whom it may concern:*

Be it known that we, RICHARD WILKINSON BATEMAN and LOFTUS HANSON BATEMAN, subjects of the King of Great Britain and Ireland, residing at 35 Hill Crest avenue, Leeds, England, and 9 Buller road, Longsight, Manchester, England, respectively, have invented certain new and useful Improvements in Driving and Reversing Gearing, of which the following is a specification.

This invention relates to driving and reversing gearing and particularly to such gearing employed in connection with planing, shaping, slotting and like machines, its object being to provide an efficient form of gearing which shall allow of such a degree of flexibility or resiliency at the instant of reversal as will prevent the occurrence of any excessive shock or jars in the driving mechanism at such instant which would cause fracture or rapid deterioration of same, but which gives a positive drive throughout the traverse between reversals.

Our invention comprises the combination with frictional means whereby the reciprocating part is brought to rest and has its direction of motion reversed, of automatic means for positively driving or actuating said part after the reversal has been completed.

Figure 1:
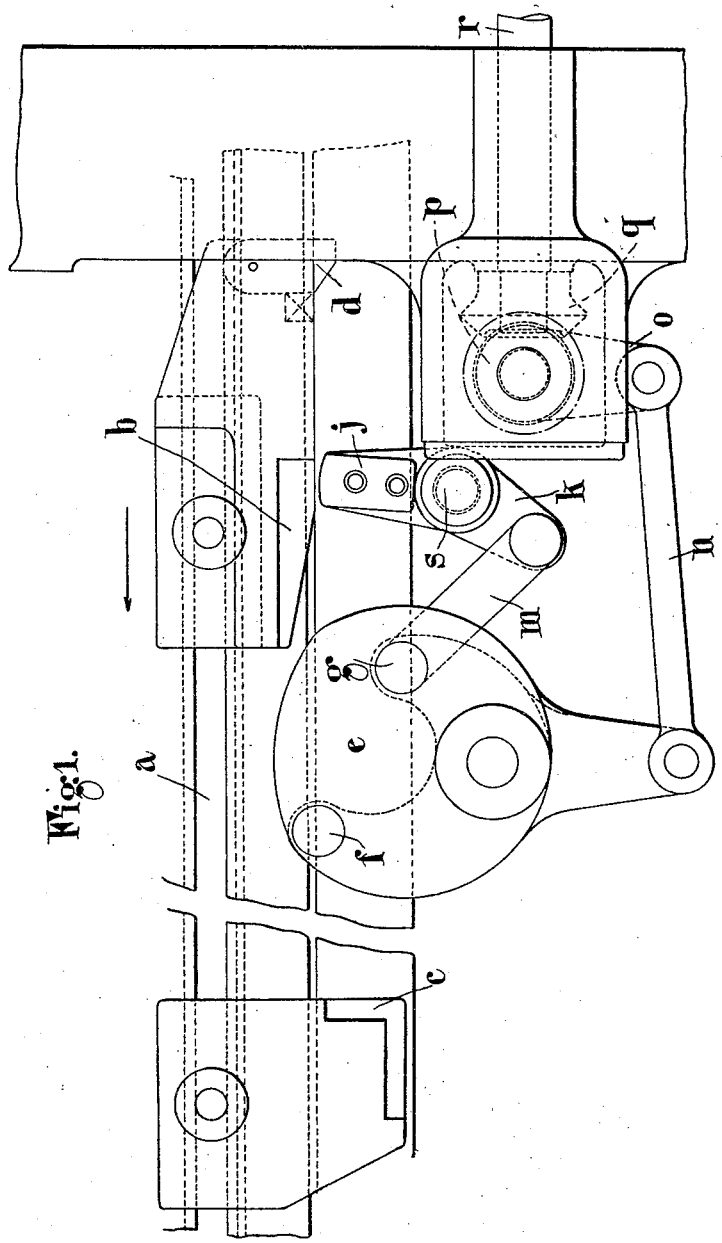
Figure 10:
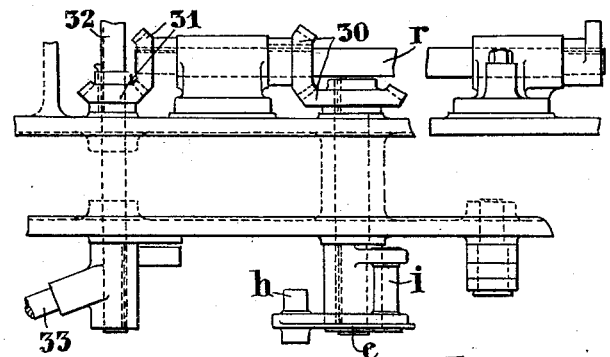
Figure 12:
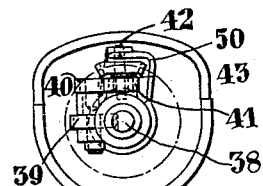
Figures 8, 9:
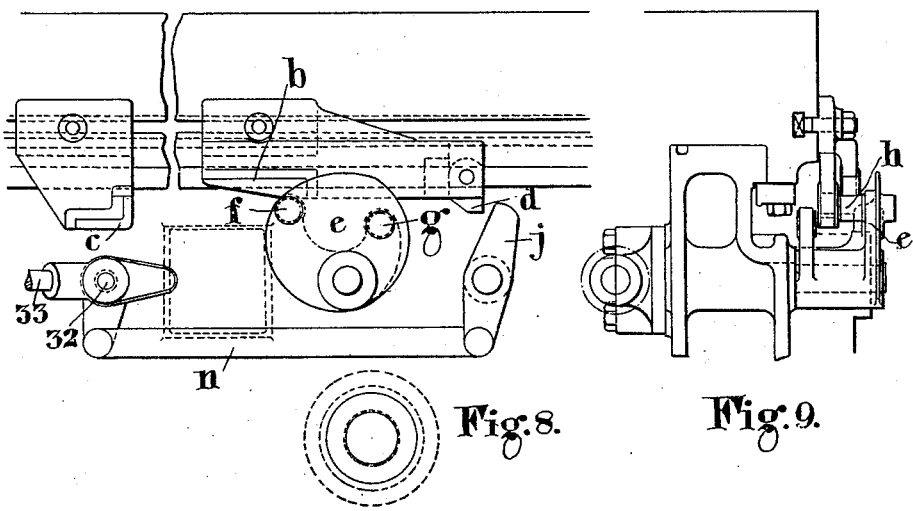

Referring to the accompanying explanatory drawings:—Figure 1 is a front elevation and Fig. 2 a plan view of the dogs or tappets for actuating the driving and reversing mechanism. Fig. 3 is an end elevation of the machine with parts shown in section. Figs. 4 and 5 are respectively sectional end and front elevations of the driving and reversing means detached from position, certain parts being omitted for the sake of clearness. Fig. 6 is an elevation looking from left to right of Fig. 4 showing the means for operating the driving and reversing mechanism. Fig. 7 is a sectional view on the line A B of Fig. 6. Figs. 8, 9 and 10 are respectively front elevation, end elevation and plan view of the dogs or tappets of a modified arrangement of our improved driving and reversing mechanism. Fig. 11 is a sectional end elevation showing the mechanism for operating the driving and reversing gear. Fig. 12 is a detail view to be hereinafter referred to. Figs. 13, 14 and 15 are views drawn to an enlarged scale of the modified arrangement of driving and reversing gear. Fig. 16 is a longitudinal view of a planing machine having the mechanism shown in Fig. 8 applied thereto.

The same reference letters in the different views indicate the same or similar parts.

Referring in the first place to Figs. 1 to 7, the reciprocating table $a$ of the planing or like machine has dogs or tappets $b$, $c$ secured thereon as usual (see Fig. 1), but in addition thereto we provide a further tappet $d$ which operates upon the reversing gear in one direction only of its traverse. The tappets actuate a cam plate $e$ carrying two wrist pins $f$, $g$ having rollers $h$, $i$ mounted thereon, the one $h$ being adapted for engagement by the tappet $b$ and the one $i$ for engagement by the tappet $c$. The tappet $d$ operates in conjunction with the arm $j$ of the bell crank lever $j$, $k$, the other arm $k$ of which is coupled by the connecting rod $m$ to the cam plate $e$. The latter actuates a connecting rod $n$ which, by means of the crank arm $o$, rocks a bevel wheel $p$ meshing with a bevel wheel $q$ on the shaft $r$.

The operation of the aforesaid mechanism is as follows:—With the parts in the positions shown, and with the table $a$ traveling in the direction of the arrow (Fig. 1), the tappet $b$ will engage the roller $h$ on the cam plate $e$ and rock the latter, so partially rotating the shaft $r$. Such movement results in the reversal of the table $a$ by the means hereinafter described. During the operation of the cam plate by the tappet $b$, the tappet $d$ slips over the upper end of the arm $j$ and does not operate the latter, but upon the reversal of the direction of rotation of the table, the tappet $d$ strikes the arm $j$ and partially rotates same about the pin $s$, so giving a further movement to the cam plate $e$ and therefore a further rotary movement to the shaft $r$. It will thus be seen that the tappet $d$ gives a supplementary movement to the cam plate $e$ and shaft $r$, after the main movement, due to the tappet $b$, is completed. When the table completes its traverse in the direction opposite to that indicated by the arrow, the tappet $c$ strikes the roller $i$ and rocks the cam plate in a reverse direction, which results in the reversal of direction of traverse of the table $a$.

The shaft $r$ carries a crank arm $t$ which is coupled by means of the connecting rod $u$ to the quadrant $v$ engaging the teeth of a racked rod $w$ (see Figs. 3 and 4). Each end of said rod is secured to a sleeve like member $x$ on the boss $y$ of the flywheel $z$. The said sleeve has a rack 3 secured thereon which engages with a pinion 4 upon a spindle 5, upon which is also secured a bevel pinion 6 gearing with a quadrant 7 attached to a slotted arm 8 pivoted about a pin 9 (see Fig. 6). The slot 10 within said arm has one portion concentric with the center pin 9, but the other portion is adapted to act as a cam to give a rocking motion to a bell crank lever 11 and so to a connecting rod 12 and a further racked quadrant 13 which engages with a pinion 14 mounted upon a spindle 16 carrying a pinion 17 engaging a rack 18 upon a strap 19 secured at one end 20 to the flywheel $z$ and adapted to surround a pulley 21 keyed upon the shaft 22 which by means of suitable gearing reciprocates the table $a$ in the known manner.

The sleeve $x$ has a projecting arm 24 thereon which receives the end of a rod 25 within a boss like portion of the flywheel $z$. The block 26 is adapted to engage one or other of a plurality of lugs or stops 27 secured upon the pulley 21. Between the end of the projection 24 and the block 26 is interposd a spring 29 by which the movement of the part 24 toward the flywheel $z$ is communicated to said block.

The operation of the parts shown in Figs. 1 to 7 is as follows:—When the tappet $b$ (Fig. 1) moves in the direction of the arrow and engages the roller $h$ on the cam plate $e$ so as to move the latter and partially rotate the shaft $r$, the rod $w$ is reciprocated in one or other direction and carries with it the sleeves $x$ (Fig. 4), one sleeve moving toward and the other away from its flywheel. Assuming the sleeve $x$ shown in Figs. 4, 6 and 7 is being moved toward its flywheel $z$, this results in a rotation of the pinion 4 by the rack 3. Such rotation causes a movement of the slotted arm 8 in the direction of the arrow through an angle approximately equal to that between the lines X and Y and so gives a rocking movement to the bell crank lever 11 due to the cam action of the portion of the slot 10 in which the bowl on said bell crank lever then works. The rocking of the latter results in the rotation of the pinion 17 which draws the strap 19 tightly round the pulley 21, so imparting to the latter the rotary motion of the flywheel $z$. There are two continuously and oppositely rotating wheels $z$ upon each planing or like machine, (see Fig. 3) so that one wheel serves to drive the table during the forward or cutting stroke and the other wheel drives it during the reverse or return stroke. At the same time that the strap 19 on the one flywheel is tightened up around its pulley, the strap on the other flywheel is slackened back by similar mechanism and so the reversal of motion of the planing machine table is accomplished. It will be seen that the actual reversal is effected by the frictional connection between the strap 19 and the pulley 21. When, however, reversal has been accomplished, the tappet $d$, Fig. 1, engages the arm $j$ and gives a further movement thereby to the cam plate $e$ and to the shaft $r$, which results in a further movement of the sleeve $x$. The previous or main movement while sufficient to operate the band 19, was not sufficient to bring the block 26 into engagement with one of the lugs 27 on the pulley 21. The further movement of the sleeve $x$, now brings such parts 26 and 27 into engagement and insures the positive driving of the pulley 21 by the flywheel $z$ in which the block 26 is mounted. During the second or supplementary movement of the sleeve $x$ and of the slotted arm 8, the bell crank lever 11 remains stationary, for the portion of the slot 10 through which the bowl on the lever 11 then travels is concentric with the pin 9 about which the arm moves. The amount of the second portion of the movement of the arm 8 in the direction of the arrow is indicated by the angle between the lines Y and Z. It will be understood that on the reversal of the movement of the sleeve $x$ after a traverse in one direction is completed, the block 26 is first withdrawn from the lugs 27 and then the pinion 17 is rotated to slacken the belt 19.

It will be readily understood that the moment of reversal of a planing machine table, very great strain is thrown upon the reversing gear and that the employment of a means for effecting such reversal which does not allow of small relative movements between the driving and driven elements would result in fracture of the gears or violent shocks and jars in the mechanism. Likewise, as is well known, a friction clutch is very unsatisfactory for use in a planing machine drive as, while it provides for slip at reversal, it cannot maintain a steady drive under heavy cuts but slips and so seriously impairs the efficiency of the machine. By the employment of our invention, we obtain all the advantages of a friction clutch in our improved strap type of clutch used at reversals, while we also insure a positive drive without slip during the cutting traverse.

The arrangement of parts shown in Figs. 1 to 7 is particularly adapted for small size machine but upon large size machines the employment of heavy reciprocating and unbalanced parts such as shown in the illustrations would be objectionable. We therefore prefer to employ for large size machines the form of mechanism shown in Figs. 8 to 15.

Referring to Figs. 8, 9 and 10 which show a mechanism somewhat similar to that shown in Figs. 1, 2 and 3, in this case the cam plate *e* operates the intermittently rocking rod or shaft *r* through the bevel wheels 30, and the supplementary lever *j* actuated by the tappet *d* operates said shaft *r* through further bevel wheels 31 upon the spindle 32. Hand operation of said shaft *r* is provided for by means of the handle 33 upon said spindle 32.

The shaft *r* carries a quadrant 34 (see Fig. 11) gearing with a quadrant 35, with which is operatively connected an arm 36. The latter actuates the driving and reversing mechanism for both directions of traverse of the machine table by means of the connecting rods 37, 37. Each of the latter is coupled up to a racked rod 38 (see Figs. 11 and 12) gearing with a wheel 39 on a spindle which also carries a wheel 40 meshing with a wheel 41 upon a short spindle 42 carrying a bevel wheel 43 gearing with a bevel wheel 44 (see Fig. 11). The latter is in operative connection with the flywheel *z* (see Fig. 15) by means of the sleeve 45, spur wheel 46 and spur wheel 47 keyed upon the boss 48 of said flywheel.

The member 50 (see Figs. 11 and 12) which forms a support for the wheels 39, 40, 41 and 43 is keyed upon the shaft 61 carrying the spur wheel 52 meshing with the spur wheel 53 upon the sleeve 54 which also carries or has formed thereon the spur wheel 55. The sleeve 54 is loose upon the boss 48. Meshing with the wheel 55 is a wheel 56 (see Fig. 13) having two slots 57, 58 therein to receive bowls 59, 60 mounted on levers 61, 62. The lever 61 corresponds to the lever 11 in Fig. 6 and actuates the clutch strap by means of the connecting rod 12, quadrant 13, pinion 14 and other parts similar to those illustrated in Fig 4.

The sleeve 54 has a projecting cam portion 63 thereon upon which rides the end of an arm 64 mounted on a spindle 65 carrying a pawl like member 66 which engages the serrated edge of a wheel 67 mounted on the boss of the pulley 21 around which the strap 19 (see Fig. 4) is placed.

The operation of the mechanism illustrated at Figs. 8 to 15 is as follows:—When the flywheel *z* rotates and carries with it the wheel 47, the latter through the wheels 46, 44, 43 and the member 50, shaft 51 and wheel 52 rotates the sleeve 54 at the same rate as the flywheel *z*, so that the wheel 56 carried on the face of the said flywheel will simply run around with the wheel 55 and have not rotation upon its own axis. When, however, the end of a traverse is reached, the tapper *b*, Fig. 8, actuates the cam plate *e* and gives a partial rotary movement to the shaft *r* resulting in a reciprocation of the rods 37 from left to right or right to left as the case may be. Such reciprocation acting through the racked rod 38 causes a rotary movement to be imparted to the wheels 39, 40, 41 and 43 about their own axes and such movement by means of the part 50, spindle 51 and wheels 52 and 53 supplements the motion received by the sleeve 54 from the wheel 47 upon the flywheel. Such supplementary motion results in the rotation of the wheel 56 about its own axis and (by means of the slot 57) in the actuation of the lever 61, link 12, quadrant 13 and other parts to bring the strap 19 (Fig. 4) into operation. During such movement, the bowl 60 has traveled through a portion of the slot 58 which is concentric with the flywheel, and the arm 64 has ridden on the cam 63. The planing machine table now has its direction of motion reversed, for while the one strap 19 has been brought into action, the other strap which has been driving the table has been put out of action.

After reversal is effected, the tappet *d* engages the arm *h* and imparts a supplementary movement to the shaft *r*. Such movement causes a further motion of the racks 38 and a further rotation of the sleeve 55 relatively to the flywheel, and of the wheel 56. Such further rotation moves the cam 63 clear of the arm 64 and the pawl 66 is free, under the action of centrifugal force assisted if desired by a spring, to engage the edge of the wheel 67 so setting up a positive drive between the flywheel *z* (which carries the spindle 65 upon which the pawl 66 is mounted) and the pulley 21. During such further movement also, the slot 58 acts on the lever 62 so as to cause its free end to act as a strut or prop against the end of the arm 68 attached to the arm 64 and thus prevent the pawl 66 from disengaging the serrated edge of the wheel 67 until released by the reversal of movement of the slotted wheel 56.

It will be understood that when the movement of the racked rods 38 is completed in either direction, the wheel 55 will again rotate at the same rate as the flywheel *z* and the wheel 56 will then remain stationary on its own axis.

When the mechanism shown in Figs. 13 to 15 is put in its out-of-service position, the movement of the racked rods 38 in a reverse or opposite direction to that before indicated, causes the sleeve 54 to rotate relatively to the flywheel and the wheel 56 to rotate about its own axis. The first action of such parts is to withdraw the catch piece end of the arm 62 from the arm 68, the cam 63 then withdrawing the pawl 66 from the wheel 67. The further rotation of said parts results in the operation of the parts 61, 12, 13 and 14 for releasing the driving strap 19 (see Fig. 4).

We prefer to employ the positive driving means for the cutting traverse only of the machine and to utilize the friction driving straps only for the return or idle stroke.

It will be seen that the essential of our invention is that the whole of the shock of reversing and restarting the reciprocating part or machine table is absorbed by frictional driving means, whereas the traversing of the table, at least on the cutting stroke, is effected by positive or non-frictional means. We thus insure perfect steadiness and absence of slip during the deepest or heaviest cuts and obtain smoothness with efficiency at reversal.

Having now described our invention what we claim as new and desire to secure by Letters Patent is:—

1. Driving and reversing gearing for planing and like machines comprising, in combination, a reversible part, frictional means for bringing said part to rest at the end of each traverse and for reversing its direction of motion, and positive means automatically brought into operation after reversal is completed for driving said part at least in one direction, as set forth.

2. Driving and reversing gearing for planing and like machines, comprising, in combination, a reversible part, two sets of operating means upon said reversible part, frictional means controlled by one set of said operating means for bringing said part to rest at the end of each traverse and for reversing its direction of motion, and positive means controlled from the other set of said operating means for driving said reversible part at least in one direction of its traverse, as set forth.

3. Driving and reversing gearing for planing and like machines, comprising, the combination with a reversible part, frictional driving means, positive driving means, and means for controlling said frictional and positive driving means, of two sets of operating means upon the reversible part for giving a main and then a supplementary movement to the said controlling means, as set forth.

4. In driving and reversing gearing for planing and like machines, the combination comprising two wheels continuously driven in opposite directions, a reversible part, two pulleys in operative connection with said reversible part and each operating in conjunction with one of said flywheels, and means for bringing said wheels and pulleys alternately into frictional driving connection with one another, and one at least of said pulleys into positive driving connection with its flywheel, as set forth.

5. In driving and reversing gearing for planing and like machines, in combination, two wheels continuously driven in opposite directions, a reversible part, pulleys concentric with said wheels and in operative connection with said reversible part, bands carried by said wheels and encircling said pulleys, means for actuating said bands, means for establishing a positive driving connection between one at least of said wheels and pulleys, and operating means upon the reversible part for bringing first one of said bands and then the positive driving means into action, as set forth.

In testimony whereof we have signed our names to this specification in the presence of two subscribing witnesses.

RICHARD WILKINSON BATEMAN,
LOFTUS HANSON BATEMAN.

Witnesses:
MALCOLM SMETHURST,
ERNOLD SIMPSON MOSELEY.